US007330811B2

(12) United States Patent
Turcato et al.

(10) Patent No.: US 7,330,811 B2
(45) Date of Patent: Feb. 12, 2008

(54) METHOD AND SYSTEM FOR ADAPTING SYNONYM RESOURCES TO SPECIFIC DOMAINS

(75) Inventors: Davide Turcato, Vancouver (CA); Frederick P. Popowich, New Westminster (CA); Janine T. Toole, Burnaby (CA); Daniel C. Fass, Vancouver (CA); James Devlan Nicholson, Port Moody (CA); Gordon W. Tisher, Surrey (CA)

(73) Assignee: Axonwave Software, Inc., Burnaby (CA)

( * ) Notice: Subject to any disclaimer, the term of this patent is extended or adjusted under 35 U.S.C. 154(b) by 572 days.

(21) Appl. No.: 10/398,130

(22) PCT Filed: Sep. 28, 2001

(86) PCT No.: PCT/CA01/01399

§ 371 (c)(1),
(2), (4) Date: Feb. 9, 2004

(87) PCT Pub. No.: WO02/27538

PCT Pub. Date: Apr. 4, 2002

(65) Prior Publication Data

US 2004/0133418 A1    Jul. 8, 2004

Related U.S. Application Data

(60) Provisional application No. 60/236,342, filed on Sep. 29, 2000.

(51) Int. Cl.
*G06F 17/27* (2006.01)

(52) U.S. Cl. .............................. 704/10; 704/9
(58) Field of Classification Search .................. 704/10, 704/9
See application file for complete search history.

(56) References Cited

U.S. PATENT DOCUMENTS

| 5,625,554 | A |   | 4/1997  | Cutting et al. ............... 364/611 |
| 5,628,003 | A |   | 5/1997  | Fujisawa et al. ............. 395/615 |
| 5,675,819 | A | * | 10/1997 | Schuetze ....................... 704/10 |
| 5,742,834 | A | * | 4/1998  | Kobayashi .................... 704/10 |
| 5,963,940 | A |   | 10/1999 | Liddy et al. .................... 707/5 |
| 5,987,414 | A |   | 11/1999 | Sabourin et al. ............ 704/270 |
| 6,081,774 | A | * | 6/2000  | de Hita et al. .................. 704/9 |
| 6,175,829 | B1 |  | 1/2001  | Li et al. ......................... 707/3 |
| 6,480,843 | B2 |  | 11/2002 | Li ................................... 707/5 |

FOREIGN PATENT DOCUMENTS

EP        0 286 719 B1     7/1995

OTHER PUBLICATIONS

Sheldon, Mark A., et al., "Discover: A Resource Discovery System Based on Content Routing," *Computer Networks and ISDN Systems* 27 (1995) 953-972.

* cited by examiner

*Primary Examiner*—Susan McFadden
(74) *Attorney, Agent, or Firm*—Seed IP Law Group PLLC

(57) ABSTRACT

A method and system for processing synonyms that adapts a general-purpose synonym resource to a specific domain. The method selects out a domain-specific subset of synonyms from the set of general-purpose synonyms. The synonym processing method in turn comprises two methods that can be used either together or on their own. A method of synonym pruning eliminates those synonyms that are inappropriate in a specific domain. A method of synonym optimization eliminates those synonyms that are unlikely to be used in a specific domain. The method has many applications including, but not limited to, information retrieval and domain-specific thesauri as a writer's aid.

60 Claims, 5 Drawing Sheets

METHOD AND SYSTEM FOR ADAPTING SYNONYM RESOURCES TO SPECIFIC DOMAINS

CROSS-REFERENCE TO RELATED APPLICATION

This application is a National Stage Application of International Application No. PCT/CA01/01399, filed Sep. 28, 2001, which claims the benefit under 35 USC 119(e) of U.S. Provisional Patent Application No. 60/236,342, filed Sep. 29, 2000, where this provisional application is incorporated by reference in its entirety.

TECHNICAL FIELD

The invention relates to the field of natural language processing, and more particularly to a method and system for processing synonyms.

BACKGROUND OF THE INVENTION

A key part of adapting natural language processing (NLP) applications to specific domains is the adaptation of their lexical and terminological resources. However, parts of a general-purpose terminological resource may consistently be unrelated to and unused within a specific domain, thereby creating a persistent and unnecessary amount of ambiguity that affects both the accuracy and efficiency of the NLP application.

The present invention presents a method for processing synonyms that adapts a general-purpose synonym resource to a specific domain. The method selects out a domain-specific subset of synonyms from the set of general-purpose synonyms. The synonym processing method in turn comprises two methods that can be used either together or on their own. A method of synonym pruning eliminates those synonyms that are inappropriate in a specific domain. A method of synonym optimization eliminates those synonyms that are unlikely to be used in a specific domain.

A method for adapting a general-purpose synonym resource to a specific domain has many applications. Two such applications are information retrieval (IR) and domain-specific thesauri as a writer's aid.

Synonyms can be an important resource for IR applications, and attempts have been made at using them to expand query terms. See Voorhees, E. M., "Using WordNet for Text Retrieval," In C. Fellbaum (Ed.), *Wordnet: An Electronic Lexical Database*. MIT Press Books, Cambridge, Mass., chapter 12, pp. 285-303 (1998). In expanding query terms, overgeneration is as much of a problem as incompleteness or lack of synonym resources. Precision can dramatically drop because of false hits due to incorrect synonymy relations, that is, incorrect pairings of terms as synonyms. This problem is particularly felt when IR is applied to documents in specific technical domains. In such cases, the synonymy relations that hold in the specific domain are only a restricted portion of the synonymy relations holding for a given language at large. For instance, a set of synonyms like cocaine, cocain, coke, snow, C valid for English in general, would be detrimental in a specific domain like weather reports, where the terms snow and C (for Celsius) both occur very frequently, but never as synonyms of each other.

A second application is domain-specific thesauri as a writer's aid. When given a target word, thesauri in word processors generally list sets of synonyms organized by part of speech, and then by sense, e.g., for snow, a thesaurus might present a listing as follows:

noun (1) precipitation falling from clouds in the form of ice crystals snowfall
noun (2) a narcotic (alkaloid) extracted from coca leaves cocaine, cocain, coke, C
verb (1) . . .

A thesaurus tailored to a specific domain would select, or at least order, the likely part of speech of a target word, the likely sense of that word for that part of speech, and favored synonym terms for that sense. The methods described in the present invention can help provide such functionality.

In both applications and others in NLP, the methods described in the present invention provide a way to automatically or semi-automatically adapt sets of synonyms to specific domains, without requiring labor-intensive manual adaptation.

The method of synonym pruning in the present invention has an obvious relationship to word sense disambiguation (Sanderson, M., *Word Sense Disambiguation and Information Retrieval*, Ph.D. thesis, Technical Report (TR-1997-7), Department of Computing Science at the University of Glasgow, Glasgow G12 (1997); Leacock, C., Chodorow, M., and G. A. Miller, "Using Corpus Statistics and WordNet Relations for Sense Identification," *Computational Linguistics*, 24, (1), pp. 147-165 (1998)), since both are based on identifying senses of ambiguous words in a text. However, the two tasks are quite distinct. In word sense disambiguation, a set of candidate senses for a given word is checked against each occurrence of the relevant word in a text, and a single candidate sense is selected for each occurrence of the word. In synonym pruning, a set of candidate senses for a given word is checked against an entire corpus, and a subset of candidate senses is selected. Although the latter task could be reduced to the former (by disambiguating all occurrences of a word in a test and taking the union of the selected senses), alternative approaches could also be used. In a specific domain, where words can be expected to be monosemous (i.e., having only a single sense) to a large extent, synonym pruning can be an effective alternative (or a complement) to word sense disambiguation.

From a different perspective, synonym pruning is also related to the task of assigning Subject Field Codes (SFC) to a terminological resource, as done by Magnini and Cavaglià (2000) for WordNet. See Magnini, B., and G. Cavaglià, "Integrating Subject Field Codes into WordNet," In M. Gavrilidou, G. Carayannis, S. Markantonatou, S. Piperidis, and G. Stainhaouer (Eds.) Proceedings of the Second International Conference on Language Resources and Evaluation (LREC-2000), Athens, Greece, pp. 1413-1418 (2000). In WordNet a set of synonyms is known as a "synset". Assuming that a specific domain corresponds to a single SFC (or a restricted set of SFCs, at most), the difference between SFC assignment and synonym pruning is that the former assigns one of many possible values to a given synset (one of all possible SFCs), while the latter assigns one of two possible values (the words belongs or does not belong to the SFC representing the domain). In other words, SFC assignment is a classification task, while synonym pruning can be seen as a ranking/filtering task.

DESCRIPTION

Throughout the following description, specific details are set forth in order to provide a more thorough understanding of the invention. However, the invention may be practiced without these particulars. Well known elements have not been shown or described in detail to avoid unnecessarily obscuring the invention. Accordingly, the specification and drawings are to be regarded in an illustrative, rather than a restrictive, sense. The present invention consists of a number of component methods where each component method is described in various configurations. For each component method, a preferred embodiment of the various configurations for that component method has been described. For particular examples of the application of the invention, reference is made to the method and system disclosed in Turcato, D., Popowich, F., Toole, J., Fass, D., Nicholson, D., and G. Tisher, "Adapting a Synonym Database to Specific Domains," In Proceedings of the Association for Computational Linguistics (ACL) '2000 Workshop on Recent Advances in Natural Language Processing and Information Retrieval, 8 Oct. 2000, Hong Kong University of Science and Technology, pp. 1-12 (2000)., (cited hereafter as "Turcato et al. (2000)") which is incorporated herein by reference.

1. Synonym Processor

Figure 1:
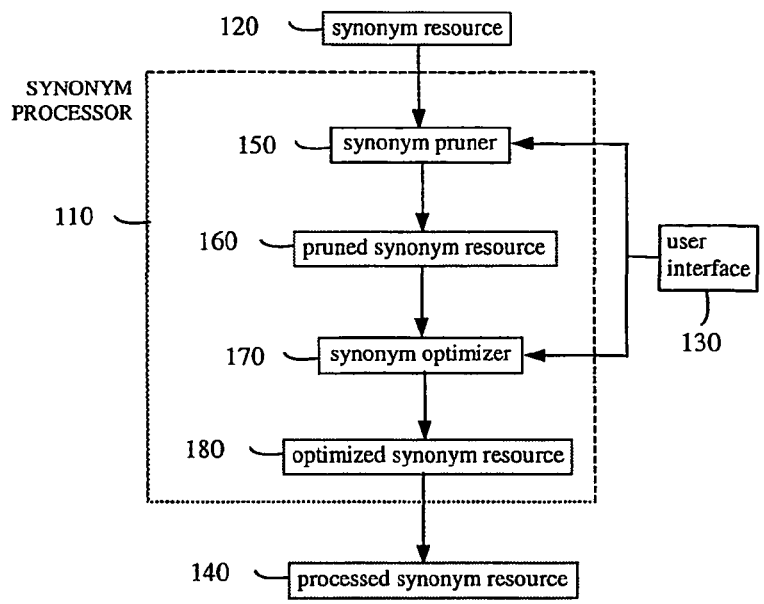
FIG. 1 is a block diagram of the synonym processor module comprising a synonym pruner and synonym optimizer.
Figure 2:
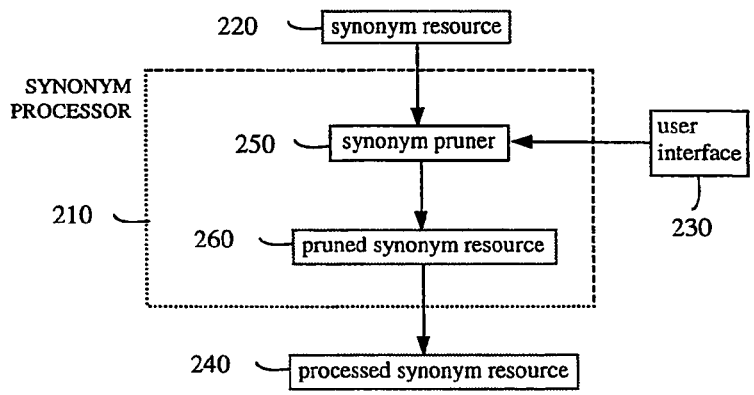
FIG. 2 is a block diagram of the synonym processor module comprising a synonym pruner.
Figure 3:
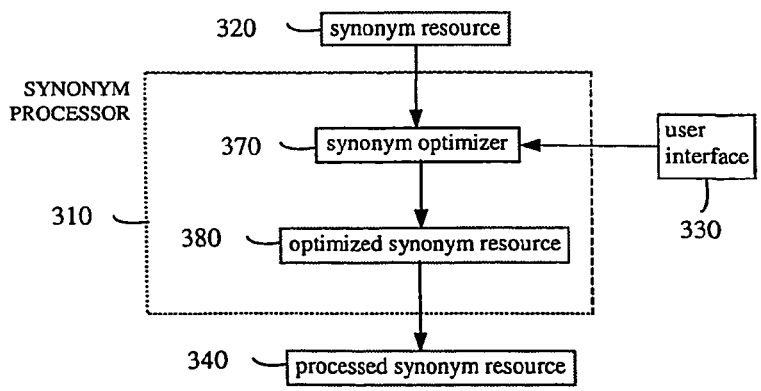
FIG. 3 is a block diagram of the synonym processor module comprising a synonym optimizer.

FIG. 1, FIG. 2, and FIG. 3 are simplified block diagrams of a synonym processor 110, 210, and 310 in various configurations. The synonym processor 110, 210, and 310 takes as input a synonym resource 120, 220, and 320 such as WordNet, a machine-readable dictionary, or some other linguistic resource. Such synonym resources 120, 220, and 320 contain what we call "synonymy relations." A synonymy relation is a binary relation between two synonym terms. One term is a word-sense; the second term is a word that has a meaning synonymous with the first term. Consider, for example, the word snow, which has several word senses when used as a noun, including a sense meaning "a form of precipitation" and another sense meaning "slang for cocaine." The former sense of snow has a number of synonymous terms including meanings of the words snowfall and snowflake. The latter sense of snow includes meanings of the words cocaine, cocain, coke, and C. Hence, snowfall and snowflake are in a synonymy relation with respect to the noun-sense of snow meaning "a form of precipitation."

FIG. 1 shows the preferred embodiment in which the synonym processor 130 comprises a synonym pruner 150 and synonym optimizer 170. This is the configuration described in Turcato et al. (2000) referenced above. The rest of the description assumes this configuration, except where stated otherwise.

FIG. 2 and FIG. 3 are simplified block diagrams of the synonym processor 210 and 310 in two less favored configurations. FIG. 2 is a simplified block diagram of the synonym processor 210 containing just the synonym pruner 250. FIG. 3 is a simplified block diagram of the synonym processor 310 containing just the synonym optimizer 380.

1.1. Synonym Pruner

Figure 4:
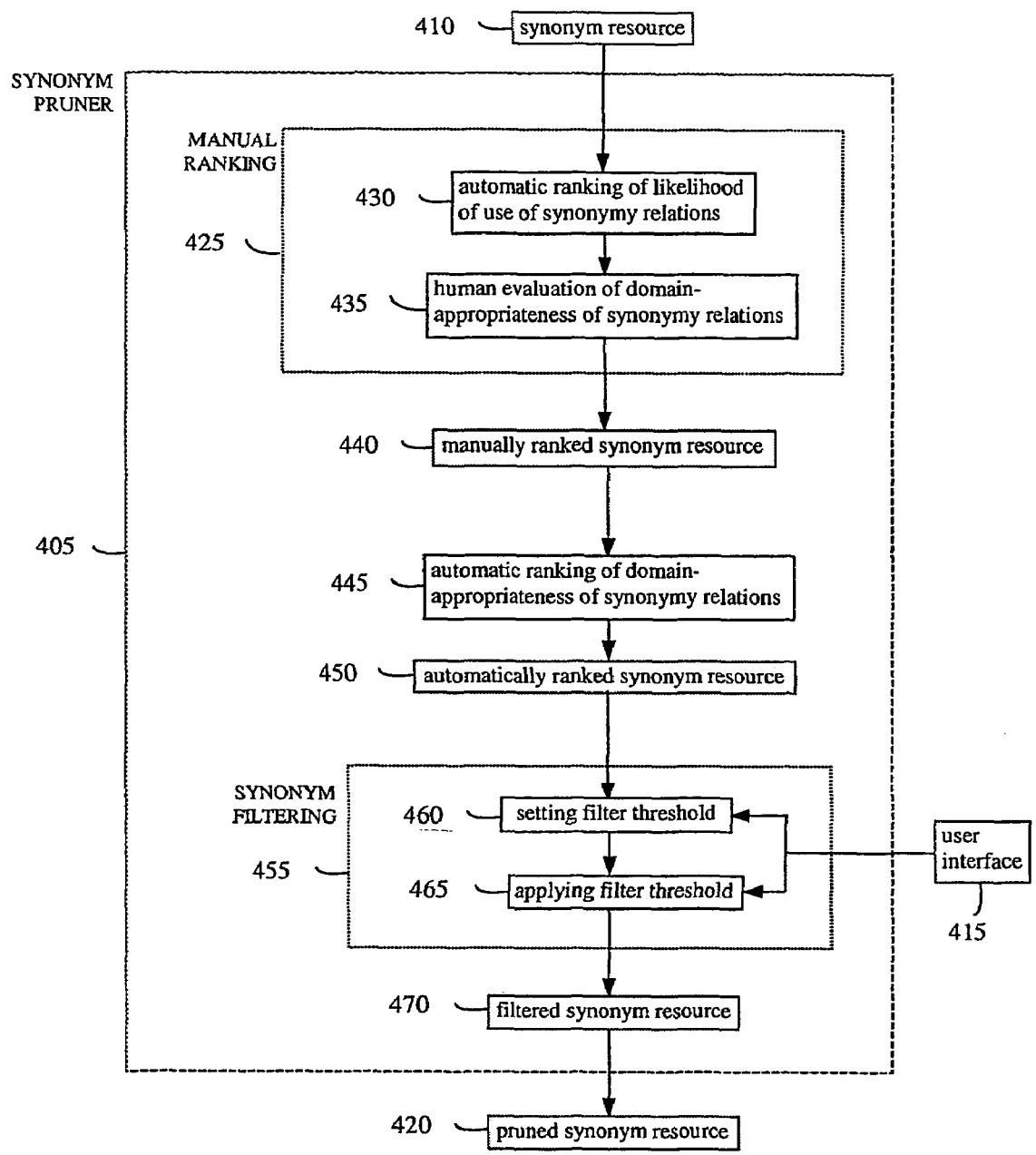
FIG. 4 is a block diagram of the synonym pruner module shown in FIG. 1 and FIG. 2 comprising manual ranking, automatic ranking, and synonym filtering.
Figure 5:
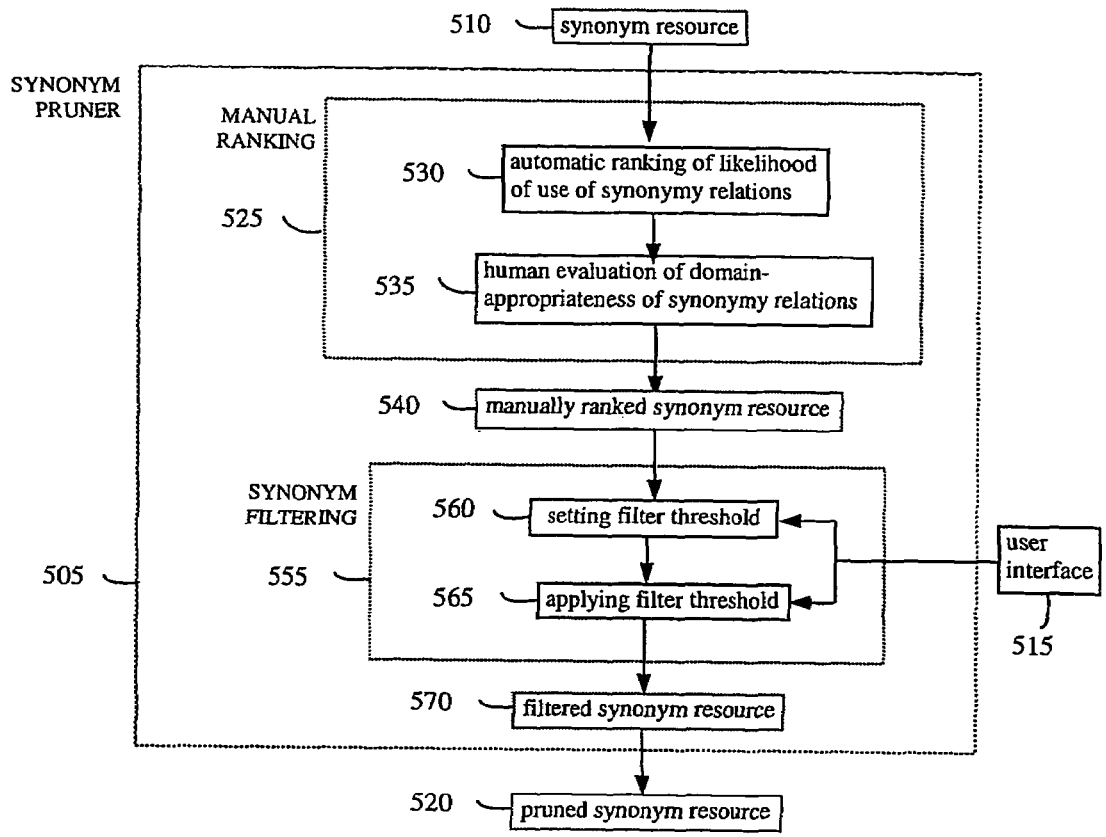
FIG. 5 is a block diagram of the synonym pruner module shown in FIG. 1 and FIG. 2 comprising manual ranking and synonym filtering.
Figure 6:
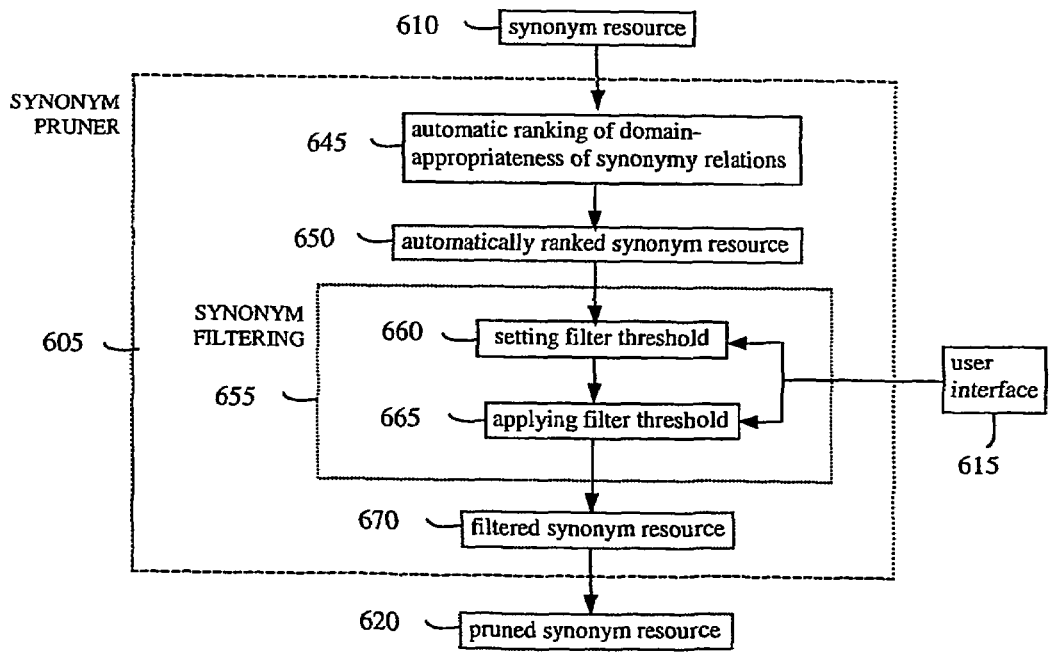
FIG. 6 is a block diagram of the synonym pruner module shown in FIG. 1 and FIG. 2 comprising automatic ranking and synonym filtering.

FIG. 4, FIG. 5, and FIG. 6 are simplified block diagrams of the synonym pruner 415, 515, and 615 in various configurations. The synonym pruner 415, 515, and 615 takes as input a synonym resource 410, 510, and 610 such as WordNet, a machine-readable dictionary, or some other linguistic resource. The synonym pruner 415, 515, and 615 produces those synonymy relations required for a particular domain (e.g., medical reports, aviation incident reports). Those synonymy relations are stored in a pruned synonym resource 420, 520, and 620.

The synonym resource 410, 510, and 610 is incrementally pruned in three phases, or certain combinations of those phases. In the first two phases, two different sets of ranking criteria are applied. These sets of ranking criteria are known as "manual ranking" 425, 525, and 625 and "automatic ranking" 445, 545, and 645. In the third phase, a threshold is set and applied. This phase is known as "synonym filtering" 455, 555, and 655.

FIG. 4 shows the preferred embodiment in which the synonym pruner 415 comprises manual ranking 425, automatic ranking 445, and synonym filtering 455. This is the configuration used by Turcato et al. (2000). The rest of the description assumes this configuration, except where stated otherwise.

FIG. 5 and FIG. 6 are simplified block diagrams of the synonym pruner 515 and 615 in two less favored configurations. FIG. 5 is a simplified block diagram of the synonym pruner 515 containing just manual ranking 525 and synonym filtering 555. FIG. 6 is a simplified block diagram of the synonym pruner 605 containing just automatic ranking 645 and synonym filtering 655.

Figure 6A:
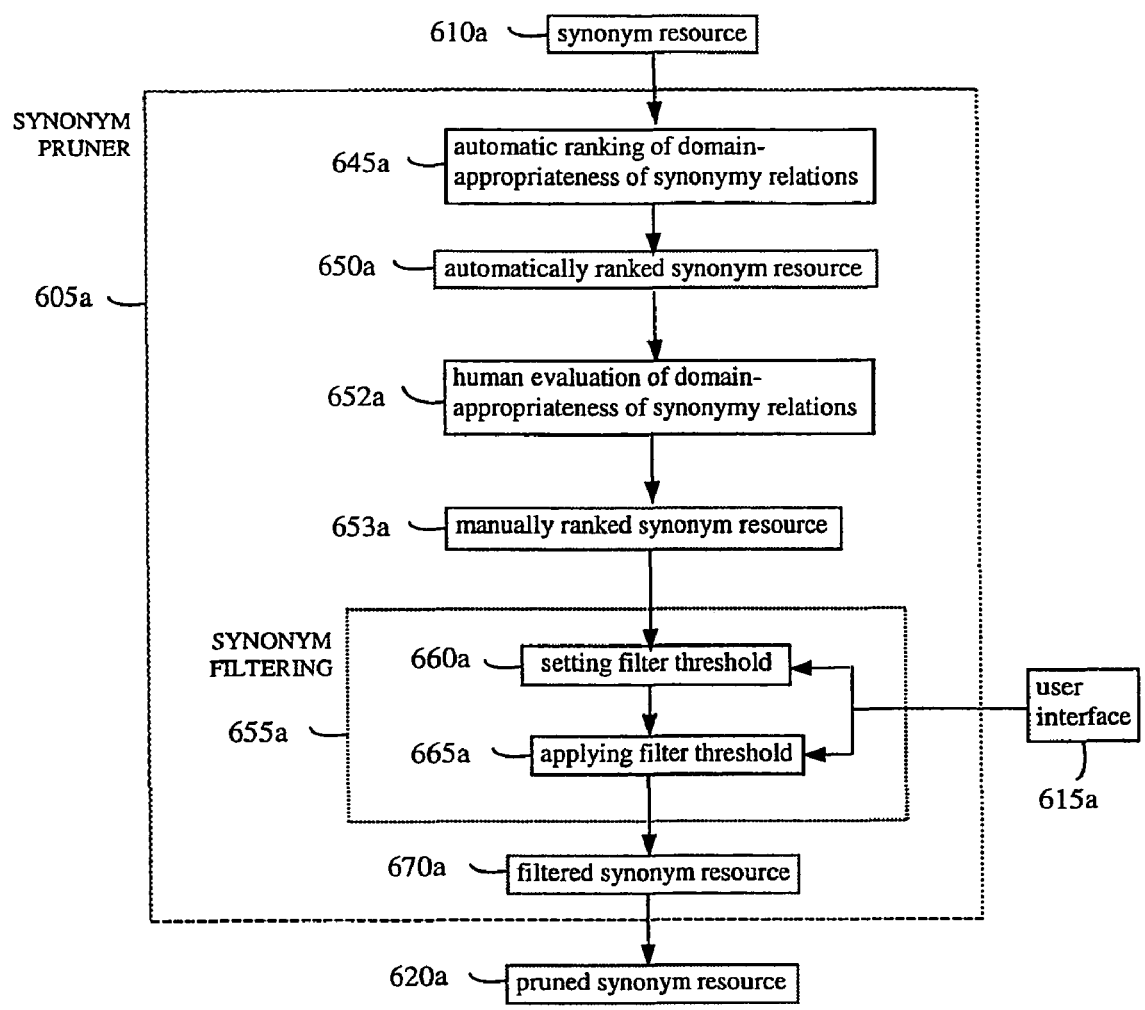
FIG. 6a is a block diagram of the synonym pruner module shown in FIG. 1 and FIG. 2 comprising automatic ranking, human evaluation, and synonym filtering.

A variant of FIG. 6 is FIG. 6a, in which the automatically ranked synonym resource 650a produced by the human evaluation of domain-appropriateness of synonymy relations 645a is passed to human evaluation of domain-appropriateness of synonymy relations 652a before input to synonym filtering 655a.

The manual ranking process 425 consists of automatic ranking of synonymy relations in terms of their likelihood of use in the specific domain 430, followed by evaluation of the domain-appropriateness of synonymy relations by human evaluators 435.

The automatic ranking of synonymy relations 430 assigns a "weight" to each synonymy relation. Each weight is a function of (1) the actual or expected frequency of use of a synonym term in a particular domain, with respect to a particular sense of a first synonym term, and (2) the actual or expected frequency of use of that first synonym term in the domain. For example, Table 1 shows weights assigned to synonymy relations in the aviation domain between the precipitation sense of snow and its synonym terms cocaine, cocain, coke, and C.

TABLE 1

| Synonymy relation between precipitation sense of snow and a sysnonym term | Weight |
|---|---|
| cocaine | 1 |
| cocain | 0 |
| coke | 8 |
| C | 9168 |

Data about the actual or expected frequency of use of a synonym term is derivable from a number of domain sources. A primary source of frequency data is some domain corpus, for example, some collection of text documents from a particular domain. Another possible source of frequency data is a history of the use of a term in some particular application. An example of such a historical use is a collection of past queries or a term list in an information retrieval application. Another example is a history of the synonym terms selected by a user from a thesaurus in a word processor.

When multiple sources of frequency data are available within a domain, the "weight" of each synonymy relation can be derived somewhat differently from the case where a single source of frequency data is available. The "weight" is again a function of the actual or expected frequency of use of the synonym terms in a synonymy relation, but now the actual or expected frequency of use can be derived from the multiple data sources. For example, in an information retrieval application, the weight of a synonymy relation can be derived from the frequencies of actual or expected use of its synonym terms in both a domain corpus (e.g., a collection of documents) and a collection of past queries. In this case, the weights of such synonymy relations would provide an estimate of how often a given term in the domain corpus is likely to be matched as a synonym of a given term in a query.

One possible method and system (of many possible methods and systems) for the automatic ranking of synonymy relations 430 that may be used with the present invention is described in section 2.2.1 of Turcato et al. (2000). Where no inventory of relevant prior queries exists for the domain then the ranking may be simply in terms of domain corpus frequency. Where an inventory of relevant prior queries exists, then the ranking uses the frequency of the occurrence of the term in the domain corpus and the inventory of query terms to estimate how often a given synonymy relation is likely to be used.

The set of synonymy-relations and their weights are then ranked from greatest weight to least, and then presented in that ranked order to human evaluators for assessment of their domain-appropriateness 435. The weights are useful if there are insufficient evaluators to assess all the synonymy relations, as is frequently the case with large synonym resources 410. In such cases, evaluators begin with the synonymy relations with greatest weights and proceed down the rank-ordered list, assessing as many synonymy relations as they can with the resources they have available.

The judgement of appropriateness of synonymy relation in a domain might be a rating in terms of a binary Yes-No or any other rating scheme the evaluators see fit to use (e.g., a range of appropriateness judgements).

The output of manual ranking 425 is a manually ranked synonym resource 440. The manually ranked synonym resource 440 is like the synonym resource 410, except that the synonymy relations have been ranked in terms of their relevance to a specific application domain. No synonymy relations are removed during this phase.

In the second phase of the preferred embodiment shown in FIG. 4, the manually ranked synonym resource 440 is automatically ranked 445. Automatic ranking 445 is based on producing scores representing the domain-appropriateness of synonymy relations. The scores are produced from the frequencies of the words involved in the synonymy relation, and the frequencies of other semantically related words. Those words involved in the synonymy relation are presently, but need not be limited to, terms from the lists of synonyms and dictionary definitions for words. Other semantically related words include, but need not be limited to, superordinate and subordinate terms for words.

The semantically words used in automatic ranking 445 may come from a number of sources. A primary source is a general-purpose synonym resource (e.g., a machine-readable dictionary or WordNet), most obviously, the general-purpose synonym resource that is being pruned 410. However, other sources are possible, for example, taxonomies and classifications of terms available online and elsewhere.

The frequency of use of those semantically related words is derivable from a number of sources also. Sources of word frequency data include those mentioned during the earlier explanation of how weights were assigned during the automatic ranking of synonymy relations 430 (e.g., a domain corpus such as a collection of documents, a collection of past queries). Other potential sources of frequency data include, but are not limited to, general-purpose synonym resources (e.g., a machine-readable dictionary or WordNet), including the general-purpose synonym resource that is being pruned 410.

One possible method and system (of many possible methods and systems) for the automatic ranking of the domain-appropriateness of synonymy relations 445 that may be used with the present invention is described in section 2.3 of Turcato et al. (2000).

The output of automatic ranking 445 is an automatically ranked synonym resource 450 of the same sort as the manually ranked synonym resource 440, with the ranking scores attached to synonymy relations. Again, no synonymy relations are removed during this phase.

In synonym filtering 455, a threshold is set 460 and applied 465 to the automatically ranked synonym resource 450, producing a filtered synonym resource 470. It is during this phase of synonym pruning 460 that synonymy relations are removed.

The threshold setting 460 in the preferred embodiment is flexible and set by the user through a user interface 415, though neither needs to be the case. For example, the threshold could be fixed and set by the system developer or the threshold could be flexible and set by the system developer.

The three phases just described can be configured in ways other than the preferred embodiment just described. Firstly, strictly speaking, automatic pruning 445 could be performed manually, though it would require many person-hours on a synonym resource 410 of any size. Second, in the preferred embodiment, the pruned synonym resource 410 is the result of applying two rounds of ranking. However, in principle, the pruned synonym resource 420 could be the result of just one round of ranking: either just manual ranking 525 as shown in FIG. 5 or just automatic ranking 645 as shown in FIG. 6.

1.2. Synonym Optimizer

Figure 7:
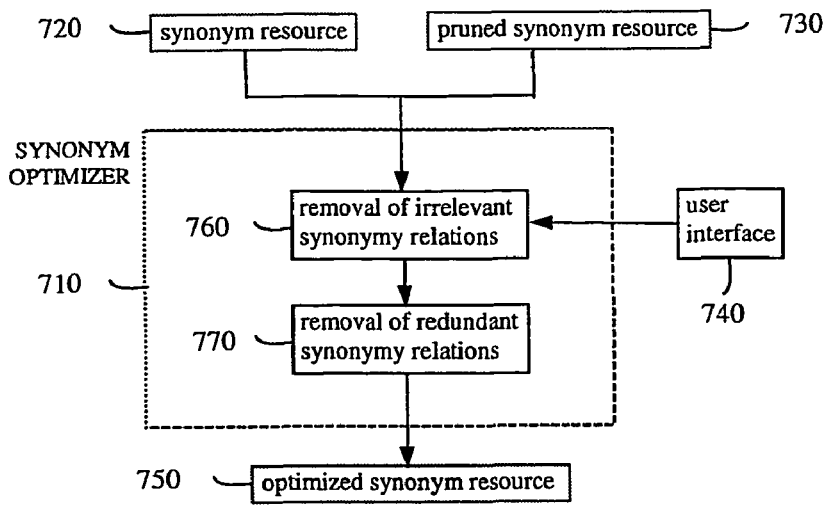
FIG. 7 is a block diagram of the synonym optimizer module shown in FIG. 1 and FIG. 3 comprising removal of irrelevant and redundant synonymy relations.
Figure 8:
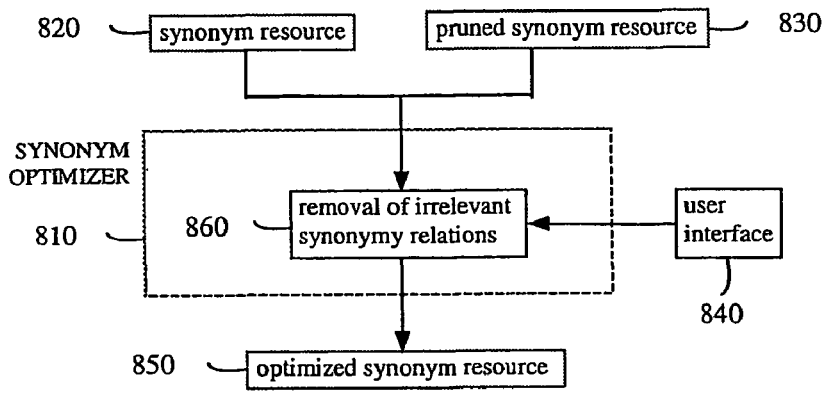
FIG. 8 is a block diagram of the synonym optimizer module shown in FIG. 1 and FIG. 3 comprising removal of irrelevant synonymy relations.
Figure 9:
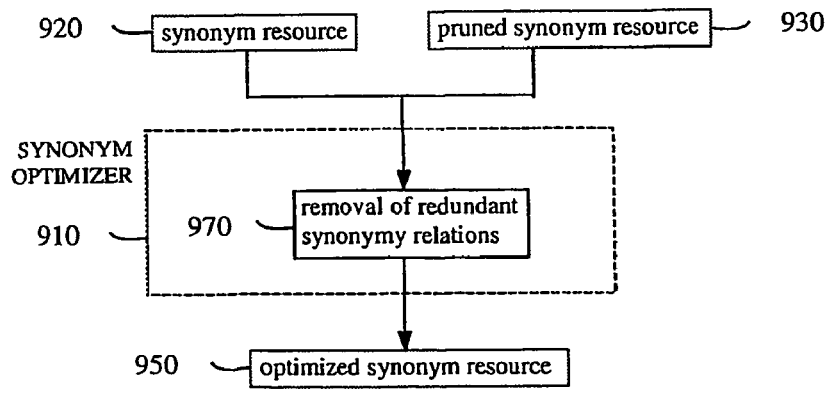
FIG. 9 is a block diagram of the synonym optimizer module shown in FIG. 1 and FIG. 3 comprising removal of redundant synonymy relations.

FIG. 7, FIG. 8, and FIG. 9 are simplified block diagrams of the synonym optimizer 710, 810, and 910 in various configurations. Input to of the synonym optimizer 710, 810, and 910 is either an unprocessed synonym resource 720, 820, and 920 or a pruned synonym resource 730, 830, and 930. The input is a pruned synonym resource 730, 830, and 930 in the preferred embodiment of the synonym processor (shown in FIG. 1). The input is an unprocessed synonym resource 720, 820, and 920 for one of the other two configurations of the synonym processor (shown in FIG. 3).

Output is an optimized synonym resource 750, 850, and 950.

The synonym optimizer 710, 810, and 910 removes synonymy relations that, if absent, either do not affect or minimally affect the behavior of the system in a specific domain. It consists of two phases that can be used either together or individually. One of these phases is the removal of irrelevant synonymy relations 760 and 860; the other is the removal of redundant synonymy relations 770 and 970.

FIG. 7 shows the preferred embodiment in which the synonym optimizer 710 comprises both the removal of irrelevant synonymy relations 760 and the removal of redundant synonymy relations 770. This is the configuration used by Turcato et al. (2000). The rest of the description assumes this configuration, except where stated otherwise.

FIG. 8 and FIG. 9 are simplified block diagrams of the synonym optimizer 810 and 910 in two less favored configurations. FIG. 8 is a simplified block diagram of the synonym optimizer 810 containing just the removal of irrelevant synonymy relations 860. FIG. 9 is a simplified block diagram of the synonym optimizer 910 containing just the removal of redundant synonymy relations 970.

The removal of irrelevant synonymy relations 760 eliminates synonymy relations that, if absent, either do not affect or minimally affect the behavior of the system in a particular domain. One criterion for the removal of irrelevant synonymy relations 760 is: a synonymy relation that contains a synonym term that has zero actual or expected frequency of use in a particular domain with respect to a particular sense of a first synonym term. For example, Table 1 shows weights assigned in the aviation domain for synonymy relations between the precipitation sense of snow and its synonym terms cocaine, cocain, coke, and C. The table shows that the synonym term cocain has weight 0, meaning that cocain has zero actual or expected frequency of use as a synonym of the precipitation sense of snow in the aviation domain. In other words, the synonymy relation (precipitation sense of snow, cocain) in the domain of aviation can be removed.

Note that the criterion for removing a synonym term need not be zero actual or expected frequency of use. When synonym resources are very large, an optimal actual or expected frequency of use might be one or some other integer. In such cases, there is a trade-off. The higher the integer used, the greater the number of synonymy relations removed (with corresponding increases in efficiency), but the greater the risk of a removed term showing up when the system is actually used.

In most cases, users will accept that irrelevant synonym terms are those with zero actual or expected frequency of use. However, the user interface 740 allows users to set their own threshold for actual or expected frequency of use, should they want to.

A possible method and system (of many possible methods and systems) for the removal of irrelevant synonymy relations 760 that may be used with the present invention is described in section 2.4.1 of Turcato et al. (2000). In particular, terms which never appear in the domain corpus are considered to be irrelevant. If the domain corpus is sufficiently large, then terms which appear in a low frequency may still be considered to be irrelevant.

The removal of redundant synonymy relations 770 eliminates redundancies among the remaining synonymy relations. Synonymy relations that are removed in this phase are again those that can be removed without affecting the behavior of the system.

A possible method and system (of many possible methods and systems) for the removal of redundant synonymy relations 770 that may be used with the present invention is described in section 2.4.2 of Turcato et al. (2000). In particular, sets of synonyms which contain a single term (namely the target term itself) are removed as are sets of synonyms which are duplicates, namely are identical to another set of synonyms in the resource which has not been removed.

The output of optimization 710 is an optimized synonym resource 750, which is of the same sort as the unprocessed synonym resource 720 and pruned synonym resource 730, except that synonymy relations that are irrelevant or redundant in a specific application domain have been removed.

Note that optimization 710 could be used if the only synonym resource to be filtered 455 was the manually ranked synonym resource 440 produced by manual ranking 425 within synonym pruning 405. Indeed, optimization 710 would be pretty much essential if manual ranking 425 and filtering 455 was the only synonym pruning 405 being performed. Optimization 710 could also in principle be performed between manual ranking 425 and automatic ranking 445, but little is gained from this because irrelevant or redundant synonymy relations in the manually ranked synonym resource 440 do not affect automatic pruning 445.

What is claimed is:

1. A method of adapting a linguistic resource to a specific knowledge domain, wherein said linguistic resource comprises:
   a plurality of target terms each having one or more meanings and
   a plurality of synonymy relations where each synonymy relation forms a relation between two synonymous terms with respect to a meaning,
   said method comprising the steps of:
   ranking said synonymy relations in relation to said domain;
   identifying in said linguistic resource one or more of said synonymy relations from a group comprising: (1) irrelevant or (2) redundant or (3) likely not to be used in said knowledge domain;
   setting a threshold value wherein said setting of said threshold value occurs either prior or subsequent to said identifying step; and
   removing said synonymy relations from said linguistic resource according to said threshold value.

2. The method of claim 1 wherein said ranking is a binary judgment.

3. The method of claim 1 wherein said ranking step comprises:
   ranking said synonymy relations according to the frequency of occurrence of said synonymous terms in said synonymy relations in said domain.

4. The method of claim 3 wherein said ranking step comprises:
  automatic ranking of said synonymy relations according to the frequency of occurrence of said synonymous terms in said synonymy relations in said domain.

5. The method of claim 4 wherein said ranking step comprises:
  providing a first automatic ranking of said synonymy relations according to the frequency of occurrence of said synonymous terms in said synonymy relations in said domain; and
  human evaluators, acting on the rankings produced by said first automatic ranking, further rank said synonymy relations in relation to said domain.

6. The method of claim 4 wherein said threshold value is selected from one of:
  a pre-determined value;
  a produced value; or
  a value set by one or more users of the method.

7. The method of claim 3 wherein said ranking step comprises:
  ranking said synonymy relations according to a numerical value for each said synonymy relation, where said numerical value for each said synonymy relation is produced from the frequency of occurrence of said synonymous terms in said synonymy relations in said domain.

8. The method of claim 7 wherein said ranking step comprises:
  automatic ranking of said synonymy relations according to a numerical value for each said synonymy relation, where said numerical value for each said synonymy relation is produced from the frequency of occurrence of said synonymous terms in said synonymy relations in said domain.

9. The method of claim 8 wherein said ranking step comprises:
  automatic ranking of said synonymy relations according to a numerical value for each said synonymy relation, where said numerical value for each said synonymy relation is produced from the frequency of occurrence of said synonymous terms in said synonymy relations in a plurality of corporal of data in said domain.

10. The method of claim 9 wherein said plurality of corporal of data of said ranking step comprises an inventory of previous queries and a searchable corpus of data.

11. The method of claim 8 wherein said ranking step comprises:
  providing a first automatic ranking of said synonymy relations according to a numerical value for each said synonymy relation, where said numerical value for each said synonymy relation is produced from the frequency of occurrence of said synonymous terms in said synonymy relations in said domain;
  human evaluators, acting on the rankings produced by said first automatic ranking, further rank said synonymy relations in relation to said domain; and further ranking said synonymy relations according to a numerical value for each said synonymy relation, where said numerical value for each said synonymy relation is produced from:
  a) the frequency of occurrence of the synonymous terms in each said synonymy relation in said domain; and
  b) the frequency of occurrence of words which are semantically related to the target term in said synonymy relation in said domain.

12. The method of claim 7 wherein said ranking step comprises:
  providing a first ranking of said synonymy relations according to a numerical value for each said synonymy relation, where said numerical value for each said synonymy relation is produced from the frequency of occurrence of said synonymous terms in said synonymy relations in said domain;
  human evaluators, acting on the rankings produced by said first ranking, further rank said synonymy relations in relation to said domain; and
  further ranking said synonymy relations according to a numerical value for each said synonymy relation, where said numerical value for each said synonymy relation is produced from
  a) the frequency of occurrence of the synonymous terms in each said synonymy relation in said domain; and
  b) the frequency of occurrence of words which are semantically related to the target term in said synonymy relation in said domain.

13. The method of claim 3 wherein said ranking step comprises:
  providing a first ranking of said synonymy relations according to the frequency of occurrence of said synonymous terms in said synonymy relations in said domain; and
  human evaluators, acting on the rankings produced by said first ranking, further rank said synonymy relations in relation to said domain.

14. The method of claim 3 wherein said threshold value is selected from one of:
  a pre-determined value;
  a produced value; or
  a value set by one or more users of the method.

15. The method of claim 1 wherein said ranking step comprises:
  ranking said synonymy relations according to a numerical value for each said synonymy relation, where said numerical value is produced from
  a) the frequency of occurrence of the synonymous terms in each said synonymy relation in said domain, and
  b) the frequency of occurrence of words which are semantically related to the target term in said synonymy relation in said domain.

16. The method of claim 15 wherein said semantically related words in said ranking step are selected from:
  the sets of synonymous terms associated with said target term;
  the set of words contained in dictionary definitions of said target term; and
  superordinate and subordinate terms for said target term.

17. The method of claim 16 wherein said semantically related words in said ranking step come from linguistic resources including one or more machine-readable dictionaries or machine-readable thesauri.

18. The method of claim 15 wherein the frequency of occurrence of said synonymous terms and semantically related words in said ranking step come from a plurality of corporal of data and linguistic resources including one or more machine-readable dictionaries or machine-readable thesauri.

19. The method of claim 15 wherein said ranking step comprises:
  ranking said synonymy relations according to a numerical value for each said synonymy relation, where said numerical value is produced from:

a) the frequency of occurrence of the synonymous terms in each said synonymy relation in said domain, and
b) the frequency of occurrence of words which are semantically related to the target term in said synonymy relation in said domain; and
human evaluators, acting on the rankings produced by said ranking step, further ranking said synonymy relations in relation to said domain.

20. The method of claim 19 wherein said threshold value is selected from one of:
a pre-determined value;
a produced value; or
a value set by one or more users of the method.

21. The method of claim 15 wherein said threshold value is selected from one of:
a pre-determined value;
a produced value; or
a value set by one or more users of the method.

22. The method of claim 1 wherein said ranking step comprises:
human evaluators ranking said synonymy relations in relation to said domain.

23. The method of claim 22 wherein said ranking is a binary judgment.

24. The method of claim 1 wherein said threshold value is selected from one of:
a pre-determined value;
a produced value;
a value set by one or more users of the method.

25. The method of claim 1 wherein said linguistic resource adapted by said method is a machine-readable dictionary or a machine-readable thesaurus.

26. The method of claim 1 wherein said linguistic resource produced by the method is used for information retrieval or as a writer's aid.

27. The method of claim 1 carried out at least in part on a computer.

28. The method of claim 1 wherein said identifying step comprises:
identifying as either (1) redundant or (2) likely not to be used said synonymy relations in said linguistic resource which contain a single term that is the same as the target term.

29. The method of 1 wherein said identifying step comprises:
identifying as either (1) redundant or (2) likely not to be used said synonymy relations which are identical to each other in said linguistic resource;
and wherein removing said synonymy relations comprises removing all but one of said synonymy relations from said linguistic resource.

30. The method of 1 wherein said identifying step comprises:
identifying said synonymy relations that are irrelevant in said linguistic resource by producing the frequency of occurrence of said synonymous terms in synonymy relations in said domain.

31. The method of claim 1 carried out at least in part on a computer.

32. The method of claim 1 wherein said removal step comprises:
removing said synonymy relations from said linguistic resource if said frequency of occurrence is equal to or less than said threshold value.

33. The method of claim 24 wherein said pre-determined threshold value is selected from one of:
the value is set at 0;
the value is variable depending on the size of the domain.

34. A method of adapting a linguistic resource to a specific knowledge domain, wherein said linguistic resource comprises:
a plurality of target terms each having one or more meanings and
a plurality of synonymy relations where each synonymy relation forms a relation between two synonymous terms with respect to a meaning,
said method comprising the steps of:
identifying one or more of said synonymy relations from a group comprising: (1) irrelevant or (2) redundant or (3) likely not to be used in said knowledge domain; and
removing said synonymy relations from said linguistic resource;
wherein said identifying includes identifying as either (1) redundant or (2) likely not to be used said synonymy relations in said linguistic resources which contain a single term that is the same as the largest term.

35. The method of claim 34 comprising the steps of:
identifying as either (1) redundant or (2) likely not to be used said synonymy relations which are identical to each other in said linguistic resource;
and wherein removing said synonymy relations comprises removing all but one of said synonymy relations from said linguistic resource.

36. The method of claim 34 wherein said identifying step comprises:
identifying said synonymy relations that are irrelevant in said linguistic resource by producing the frequency of occurrence of said synonymous terms in synonymy relations in said domain.

37. The method of claim 34 wherein said linguistic resource adapted by said method is a machine-readable dictionary or a machine-readable thesaurus.

38. The method of claim 34 wherein said linguistic resource produced by said method is used for information retrieval or as a writer's aid.

39. The method of claim 34 carried out at least in part on a computer.

40. The method of claim 34 further comprising the steps of:
setting a threshold value wherein said setting of said threshold value occurs either prior or subsequent to said identifying step; and
wherein said removal step further comprises removing said synonymy relations from said linguistic resource according to said threshold value.

41. The method of claim 40 wherein said identifying step comprises:
identifying said synonymy relations that are irrelevant in said linguistic resource by producing the frequency of occurrence of said synonymous terms in synonymy relations in said domain.

42. The method of claim 41 wherein said removal step comprises:
removing said synonymy relations from said linguistic resource if said frequency of occurrence is equal to or less than said threshold value.

43. The method of claim 40 wherein said threshold value is selected from one of:
a pre-determined value;
a produced value; or
a value set by users of the method.

44. The method of claim 43 wherein said pre-determined threshold value is selected from one of:
the value is value set at 0;
the value is variable depending on the size of the domain.

45. The method of claim 40 wherein said linguistic resource adapted by said method is a machine-readable dictionary or a machine-readable thesaurus.

46. The method of claim 40 wherein said linguistic resource produced by said method is used for information retrieval or as a writer's aid.

47. The method of claim 40 carried out at least in part on a computer.

48. The method of claim 34 further comprising the steps of:
identifying said synonymy relations that are irrelevant in said knowledge domain;
removing said synonymy relations from said linguistic resource;
identifying in said linguistic resource from said removal step said synonymy relations that are either (1) redundant or (2) likely not to be used in said knowledge domain; and
removing said synonymy relations from said linguistic resource;
wherein the order of the two identifying steps can be transposed.

49. The method of claim 48 carried out at least in part on a computer.

50. A computer program product for adapting a linguistic resource to a specific knowledge domain, wherein said linguistic resource comprises:
a plurality of target terms each having one or more meanings, and
a plurality of synonymy relations where each synonymy relation forms a relation between two synonymous terms with respect to a meaning,
said computer program product comprising:
a computer usable medium having computer readable program code means embodied in said medium for the steps of:
ranking said synonymy relations in relation to said domain;
identifying one or more of said synonymy relations from a group comprising: (1) irrelevant or (2) redundant or (3) likely not to be used in said knowledge domain;
setting a threshold value wherein said setting of said threshold value occurs either prior or subsequent to said identifying step; and
removing said synonymy relations from said linguistic resource according to said threshold value.

51. The computer program product of claim 50 wherein said linguistic resource adapted by said computer program product comprises a machine-readable dictionary or a machine-readable thesaurus.

52. The computer program product of claim 51 wherein said linguistic resource produced by said computer program product is used for information retrieval or as a writer's aid.

53. The computer program product of claim 50 wherein said linguistic resource adapted by said computer program product comprises a machine-readable dictionary or a machine-readable thesaurus.

54. The computer program product of claim 50 wherein said linguistic resource produced by said computer program product is used for information retrieval or as a writer's aid.

55. A computer program product for adapting a linguistic resource to a specific knowledge domain, wherein said linguistic resource comprises:
a plurality of target terms each having one or more, and
a plurality of synonymy relations where each synonymy relation forms a relation between two synonymous terms with respect to a meaning,
said computer program product comprising:
a computer usable medium having computer readable program code means embodied in said medium for:
identifying one or more of said synonymy relations from a group comprising: (1) irrelevant or (2) redundant or (3) likely not to be used in said knowledge domain;
setting a threshold value wherein said setting of said threshold value occurs either prior or subsequent to said identifying step; and
removing said synonymy relations from said linguistic resource according to said threshold value.

56. The computer program product of claim 55 wherein said linguistic resource adapted by said computer program product comprises a machine-readable dictionary or a machine-readable thesaurus.

57. The computer program product of claim 55 wherein said linguistic resource produced by said computer program product is used for information retrieval or as a writer's aid.

58. The computer program product of claim 55 further comprising:
identifying said synonymy relations that are irrelevant in said knowledge domain;
removing said synonymy relations from said linguistic resource;
identifying in said linguistic resource from said removal step said synonymy relations that are either (1) redundant or (2) likely not to be used in said knowledge domain; and
removing said synonymy relations from said linguistic resource;
wherein the order of the two said identifying steps can be transposed.

59. The computer program product of claim 58 wherein said linguistic resource adapted by said computer program product comprises a machine-readable dictionary or a machine-readable thesaurus.

60. The computer program product of claim 58 wherein said linguistic resource produced by said computer program product is used for information retrieval or as a writer's aid.

* * * * *